(12) United States Patent
Subramanya et al.

(10) Patent No.: US 8,635,624 B2
(45) Date of Patent: Jan. 21, 2014

(54) RESOURCE MANAGEMENT USING ENVIRONMENTS

(75) Inventors: Ananth Subramanya, Bangalore (IN); Prasad A Chodavarapu, Bangalore (IN); Ravindra S. Gajulapalli, Bangalore (IN); Rama Kanneganti, Grosse Point Shores, MI (US); Vikram Duvvoori, Gilroy, CA (US)

(73) Assignee: HCL America, Inc., Sunnyvale, CA (US)

( * ) Notice: Subject to any disclaimer, the term of this patent is extended or adjusted under 35 U.S.C. 154(b) by 342 days.

(21) Appl. No.: 12/908,903

(22) Filed: Oct. 21, 2010

(65) Prior Publication Data

US 2012/0102498 A1 Apr. 26, 2012

(51) Int. Cl.
*G06F 9/46* (2006.01)
(52) U.S. Cl.
USPC .......................................... 718/104; 709/226
(58) Field of Classification Search
USPC ................ 705/1.1, 5, 7.12–7.25, 301; 717/101–103, 124–135; 718/102–104; 709/226
See application file for complete search history.

(56) References Cited

U.S. PATENT DOCUMENTS

| 7,137,119 B1 * | 11/2006 | Sankaranarayan et al. ... | 718/103 |
| 7,484,242 B2 * | 1/2009 | Aggarwal et al. ................. | 726/7 |
| 7,620,706 B2 * | 11/2009 | Jackson ......................... | 709/223 |
| 2003/0061260 A1 * | 3/2003 | Rajkumar ...................... | 709/104 |
| 2009/0100435 A1 * | 4/2009 | Papaefstathiou et al. ..... | 718/104 |
| 2009/0249284 A1 * | 10/2009 | Antosz et al. ................. | 717/104 |
| 2011/0119678 A1 * | 5/2011 | Filali-Adib et al. .......... | 718/105 |
| 2012/0016713 A1 * | 1/2012 | Wilcock et al. .............. | 705/7.27 |
| 2012/0284726 A1 * | 11/2012 | Luszczek et al. ............. | 718/102 |

OTHER PUBLICATIONS

Yan, Yuhong, et al., "Application of Multiagent Systems in Project Managment", Int. J. Production Economics, 68 (2000), 185-197, (2000), 15 pages.

* cited by examiner

*Primary Examiner* — Diem Cao
(74) *Attorney, Agent, or Firm* — Schwegman Lundberg & Woessner, P.A.

(57) ABSTRACT

Apparatus, systems, and methods may operate to receive time-based reservation requests for predefined resource environments comprising resource types that include hardware, software, and data, among others. Additional activities may include detecting a conflict between at least one of the resource types in a first one of the predefined resource environments and at least one of the resource types in a second one of the predefined resource environments, and resolving the conflict in favor of the first one of the predefined resource environments by reserving additional resource elements in a cloud computing architecture and/or reserving a less capable version of the second one of the predefined resource environments. Additional apparatus, systems, and methods are disclosed.

24 Claims, 4 Drawing Sheets

RESOURCE MANAGEMENT USING ENVIRONMENTS

BACKGROUND

In an enterprise where multiple projects operate in parallel, it can be useful to manage shared resources (e.g., hardware and software). As the number and size of the projects increase, the problem of allocating resources can become unmanageable. While adept management can lead to decreased cost, improved quality, and timely delivery across one or more organizations, the most beneficial tradeoffs with respect to numerous projects and resources are not always apparent.

DETAILED DESCRIPTION

Figure 1:
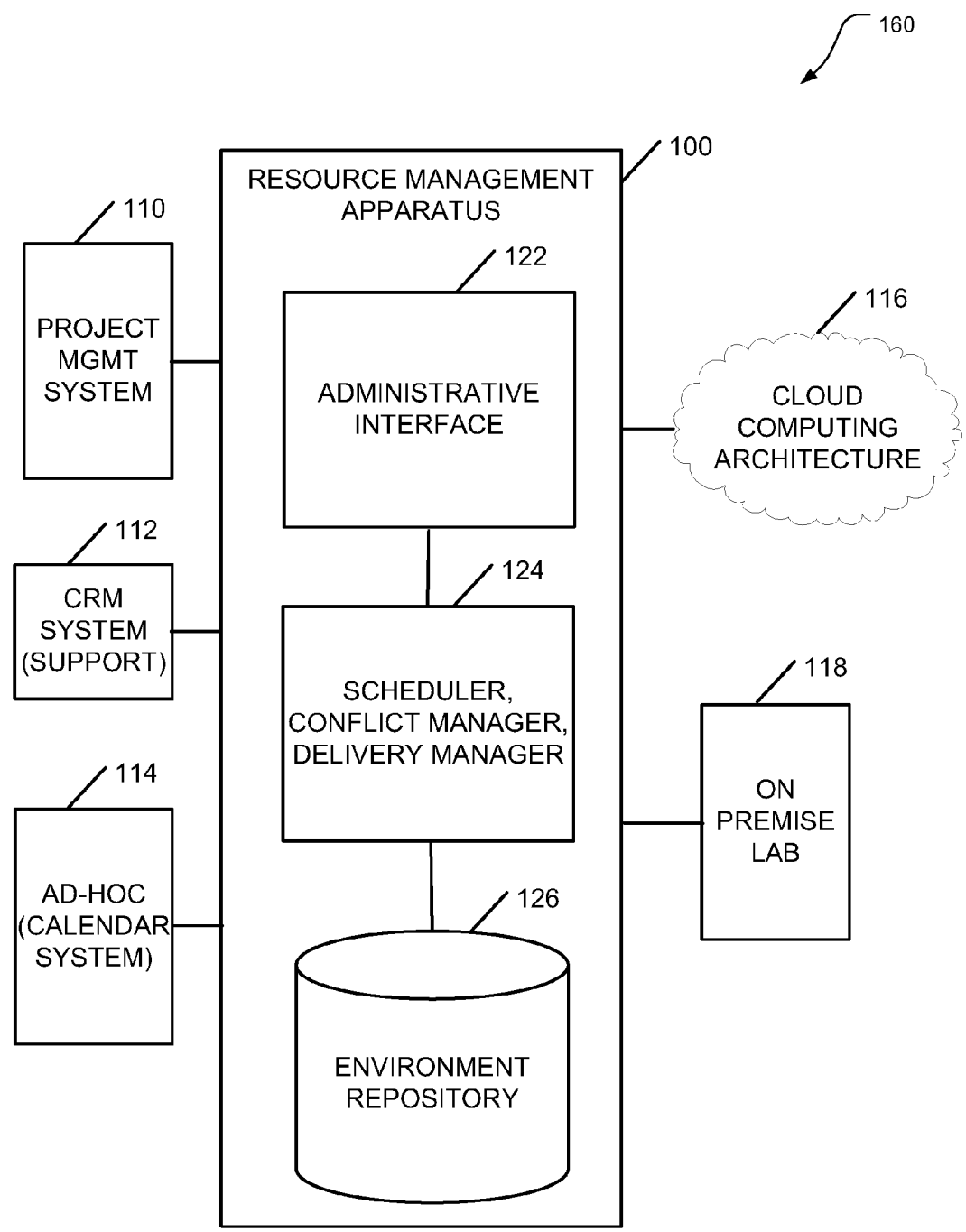
FIG. 1 is a block diagram illustrating elements of a system that operates according to various embodiments of the invention.

In many embodiments, the challenge of managing resources to support various industrial projects, such as software development and prototype fabrication, may be addressed using the concept of reserving environments. As an introduction to this topic, and for the purposes of this document, the following definitions may be observed.

"Resource types" may be used to categorize a variety of resources. Some resource types include locations, hardware, software, data, communications capacity, and power. For example, the resource types which are used during a product's development and manufacturing life cycle might include the following:

Location—the space encompassed by an environment, such as a laboratory, meeting room, airport runway, cargo container, etc. Locations can be further characterized by specifications, including volume, area, temperature, availability of cooling and/or heating, handicapped access, etc.

Hardware—physical devices at a location, such as machines in a shop; host computers, servers, oscilloscopes, and workstations in a laboratory; or voting machines in a polling place; etc. Hardware resources may be further characterized by specifications, such as number of processors, memory size, and ports provided by a computer, etc.

Software—applications that support operations within an environment, such as operating systems, databases, virtual application servers, etc. Software resources may be further characterized by specifications, including the number of license seats available, the amount of data that can be processed, input/output file format capability, etc.

Data—elements of information that may be fabricated or real, including pre-populated sample test data, acquired data, user survey data, etc. As is the case with locations, hardware, and applications, data can be further characterized by specifications, including the total amount, delivery speed, format, word length, compression, protocol standard, etc.

Communications Capacity—the available bandwidth of a network within an environment, or communicatively coupled to an environment, such as the network bandwidth available to serve mobile phones, or the network bandwidth available to connect servers and clients in a laboratory. Communications capacity can be further characterized by specifications, including network latency, acceptable protocols, redundancy, etc.

Power—the energy available to an environment, such as that used to power the servers in the laboratory. Power can be further characterized by specifications, including measures of peak power needed and average power used, etc.

For the purposes of this document, an "environment" comprises a defined set of resources (each of which may be associated with a resource type) that are used to support the completion of a project. For example, while it may be possible to reserve a group of servers for a project, there is also the practical advantage of reserving the laboratory occupied by the servers to be considered. Thus, a mechanism to reserve, on-demand, environments that are used to support projects is desirable. Such environments may therefore include a wide variety of resources, including lab space, hardware, software, data, communications capacity, power, etc.

FIG. 1 is a block diagram illustrating elements of a system 160 that operates according to various embodiments of the invention. The system 160, which may be referred to as a Lab Environment Manager (LEM) in portions of this document for reasons of simplicity, enables the management of environments for project support within an enterprise. Project teams can use the system 160 to reserve environments that comprise servers, applications, and related data, among other elements, to help support the requirements of their tasks.

Environments may comprise resources that are owned by an enterprise, whether located on the company premises, or elsewhere. Environments may also comprise resources that are part of a cloud computing architecture, which includes resources that can be shared on demand, perhaps using the Internet or some other global computer network to access them, in a manner similar to which electricity is provided by a public utility. Some environments comprise a mix of local and cloud-based resources.

For example, an enterprise may define an environment comprising multiple data centers (hardware), some on the company premises (location) and some in the cloud. Infrastructure (hardware and software) that is spread across the data centers induces latency, which characterizes the hardware. Hosts (hardware) in the data centers include servers characterized by processor types, memory size, and non-volatile mass storage. The data forming part of the environment includes configuration data which is used to configure the applications (software), the base initialization data that is loaded into the applications (software) to bring them up to an initial state, and transaction/analytical data with specific characteristics and/or size.

When reservations are requested for one or more defined environments, it may be assumed that the request is for an ideal configuration. That is, the requested environments are sufficient (or more than sufficient) to satisfy the projects that they support, so that deliverables can be provided on-time and within budget. However, in some cases it is possible to use an environment that still satisfies the requirements of a project, while not being ideal. The system 160 permits defining thresholds for what is acceptable as one of these "less capable" environments. For instance, an environment can be defined with an ideal test data set of one million unique users; a less capable environment might still enable the provision of project deliverables with a test data set of one-half million unique users, although the end result might be presented with a lower confidence level.

The system 160 can operate to abstract the knowledge of the physical locations of resources. Thus, whether the desired resources are located on the premises 118 of a company, or in the cloud computing architecture 116, may be immaterial. In either case, provisioning of the desired resources is managed by the system 116, via the scheduler/conflict manager 124.

The system 160 can be used to manage environmental definitions stored in an environment repository 126, via the scheduler/conflict manager 124. The repository 126 may comprise one or more CMDBs (Configuration Management Databases) and/or asset management systems—these systems contain definitions of environments, and may in some enhanced versions include the state of each of the resources associated with each environment. For example, if a CRM (customer relations management) application that is operating with a million customers is to be tested for overload conditions, the repository 126 may be searched to find a data set of one million customers to be used for this type of testing. The state of the data set resource in this case may thus comprise the consumption data for one million customers.

Any number of environments can be defined, perhaps using the administrative interface 122, based on project requirements. The available resources to be used in the defined environments may be accessed via project management systems 110, CRM (customer relations management) support systems 112, calendaring/scheduling systems 114, a cloud computing architecture 116, and on-premise laboratories 118, among others. Similarly, the various elements may be accessed within the system 160 as mechanisms which provide requests for reservations of environments.

For example, the project management system 110 may be accessed by various project management personnel. As various resources and/or environments are requested by these managers, perhaps based on tasks defined in the project plans, these requests can automatically be passed on to the scheduler/conflict manager 124 to resolve any conflicts that occur, and to reserve the requested environments. When a project plan is updated, the reservations can be adjusted to accommodate new dates and/or environments. This integration can be bi-directional. Thus, if a scheduled resource/environment becomes unavailable after it has been reserved, this event can be raised as a risk within the project management system 110. The absence of the resource/environment also creates a conflict, which can be managed using conflict resolution, as noted below.

The CRM system 112 provides a way of managing interactions with the customers, perhaps aided by one or more software CRM modules that track customer interactions, such as email communications between customers and vendors, and/or customer support staff. If an issue has been raised within the CRM system 112, environments can be reserved to reproduce the issue. If a defect has been identified that requires repair, environments can be reserved to repair the situation and test the solution.

Calendaring systems 114, which may be ad-hoc (need-based), can make use of applications such as Microsoft® Outlook® or Lotus Notes® scheduling software. The bi-directional interaction within the system 160 then operates to provide requests for environments, and to feed back the availability (or lack of availability) of the requested resources/environments.

The system 160, on receipt of a reservation request, can verify the requested environment against the repository 126 to ensure that the requested environment can be provisioned. Environments can be scheduled/reserved for repetitive use. If the requested environment is not available, a less-capable environment may be substituted for the requested environment. The substitution may occur automatically, perhaps based on the condition that specified threshold conditions are met. In some embodiments, the potential for substitution may be published to an end-user to determine whether actual substitution will be permitted.

Sometimes the priority order of environment reservations is based on the severity of the issue at hand. For example, project issue severity may be classified using several levels. These may be individually defined as follows.

A "severity one" issue is a catastrophic problem which may impact production systems in a way that causes loss of production data, and for which no procedural workaround exists.

A "severity two" issue is a high-impact problem that anticipates retaining some system functionality, but with a severely reduced capacity, such that the system is exposed to potential loss, or interruption of service.

A "severity three" issue is a lower impact problem which results in partial and non-critical loss of functionality. Operations are impaired, with limited or no loss of functionality, or impact to operations. An end user may circumvent or avoid the issue with appropriate action.

A "severity four" issue represents a general usage question or recommendation for future enhancements/modifications. It does not impact quality, performance, or functionality of the product or service.

With these definitions in mind then, some example implementations of various embodiments will now be described.

When an environment is requested within the system 160, it is reserved as requested, if available. However, there may be situations when there is insufficient capacity to provision all requests exactly as they are made. This means that a conflict exists, and the system 160 then operates to implement conflict management.

For example, if a request is presented to reserve an environment to accommodate a customer support problem constituting a severity one issue, that may take priority over an existing project reservation, which may constitute a severity three issue. An emergency build operation, which constitutes a severity two issue, may also take precedence over the existing project reservation.

When there are requests of the same priority level and capacity is insufficient to support all requests, manual intervention or randomly assigned environment reservations may be used to resolve the conflict.

Based on the environment configuration, an attempt may be made to secure resources in a data center of choice with defined server configurations, applications, and data sets.

In addition, or in the alternative, and subject to acceptable thresholds, the system 160 may operate to resolve the conflict by reserving a less-capable environment when an exact match cannot be found. For example, if the requested environment requires a server with 8 GB of RAM, but one with only 6 GB exists, then the environment having 6 GB may be reserved, based on the priority of the request, and the acceptable thresholds that have been established.

In another example, when an environment is needed to test order placement for 100,000 unique items, an environment in which only 50,000 unique items are created may be reserved instead. In yet another example, when all applications in a requested environment are to be co-located at the same data center, an environment having some applications (and the databases which they access) located at one data center, and other application (that are not directly dependent on access to those databases) located at another data center, might be reserved instead.

When there are multiple requests for environments and there isn't enough capacity to fulfill the requests, a workflow within the system 160 may be initiated, with a delivery manager (e.g., forming part of the conflict manager 124) to set the priorities of the requests. In systems 160 where a cloud computing architecture 116 is available, the delivery manager can approve the expense to reserve an on-demand environment that includes resources in the cloud. The system 160 might operate to create a purchase order for such resources.

The system 160 can provide reports on environment and resource capacity over a given time interval, along with associated costs. These reports may be useful to forecast demand and expenses. Such reports may also serve to anticipate issues arising due to resource shortages.

Reports generated by the system 160 can thus provide insight into the capacity of the resources within each of the environments, and can operate to prompt the system 160 to send requests to arrange for spare capacity. For example, if a cloud computing architecture 116 solution is available, the system 160 can be configured to purchase, within predefined limits, reservations for resources to make up any deficiencies in the requested environments. Costs for this activity may be directly invoiced against the project that requests the environment. This permits the system to automatically scale capacity, based on need. The following are a few examples of operations conducted according to various embodiments.

In a first instance, a product team working on product requests a testing environment for a week. The product team creates an appointment in their email application and includes the testing laboratory as a resource. They select the duration, name the teams that will use the resource, include these in an appointment, and schedule it. The system 160 can respond by receiving the request via the calendaring system 114 to verify lab availability. The scheduler 124 can reply with a confirmation, or attempt to resolve any conflict in a number of ways, such as suggesting an earlier or later available set of dates, perhaps via the administrative interface 122.

In a second instance, an engineering team would like to implement a weekly release cycle during their implementation of a software product as part of the beta version development. The engineering manager creates a recurring appointment with the build team in the project management system 110 and lists the build environment as a resource. The system 160 can operate to check the associated test bed laboratory and equipment for availability, and reserve it for weekly build exercises. If all resources in the environment are not available during a given week, a conflict notice can be posted back to the project management system 110 (e.g., perhaps as an email message to the manager and the build team), as well as being posted to the administrative interface 122, and the manager can change his plan accordingly. In the alternative, a less capable environment may be reserved.

In a third instance, a severity one issue is reported by a customer. A support engineer is notified via the CRM system 112, to request an environment for reproducing the problem. This request has the highest level of priority; when the requested environment is not available, project management reservations can be altered in the project management system 110 to allow an environment to be reserved within the CRM system 112, as requested. The support engineer is thus able to reserve an environment to troubleshoot the issue.

As part of resolving this issue, a solution is to be delivered to the customer. The engineering team presents an urgent ad-hoc request for an environment to test the solution, also via the CRM system 112. An environment is then reserved within the system 160, subject to availability. If needed, project reservations requested by the project management system 110 are revised to allow emergency build and testing operations to occur.

In a fourth and related instance, support issues can arise during project use of environments. For example, a project team may present a request to use an environment via the project management system 110, which is granted by the scheduler 124. A day before a testing exercise within the project is to begin, a severity two issue is reported via the CRM system 112, and a support engineer raises a request for part of the same environment that is being used in the testing exercise. In the absence of capacity, the support engineer is provided with the environment by the conflict manager 124, and the project manager is notified of the change (e.g. via the project management system 110), as well as of the updated availability of the testing environment. The project management system 110 is updated with the slippage in the project testing schedule, and a new reservation is made for the test environment on behalf of the project team.

In a final instance, multiple projects can be scheduled to use a variety of resources. In this case, two projects have similar test timelines and each presents a request for respective environments within the project management system 110. The system 160 receives the requests and project timelines. If there is insufficient capacity to reserve both of the requested environments, the conflict manager 124 may initiate a workflow with the delivery manager, to gather additional information on the two projects. The delivery manager can operate to assign a higher priority to one of the projects than the other. The scheduler 124 within the system 160 then operates to reserve the environments based on the assigned priority.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 2:
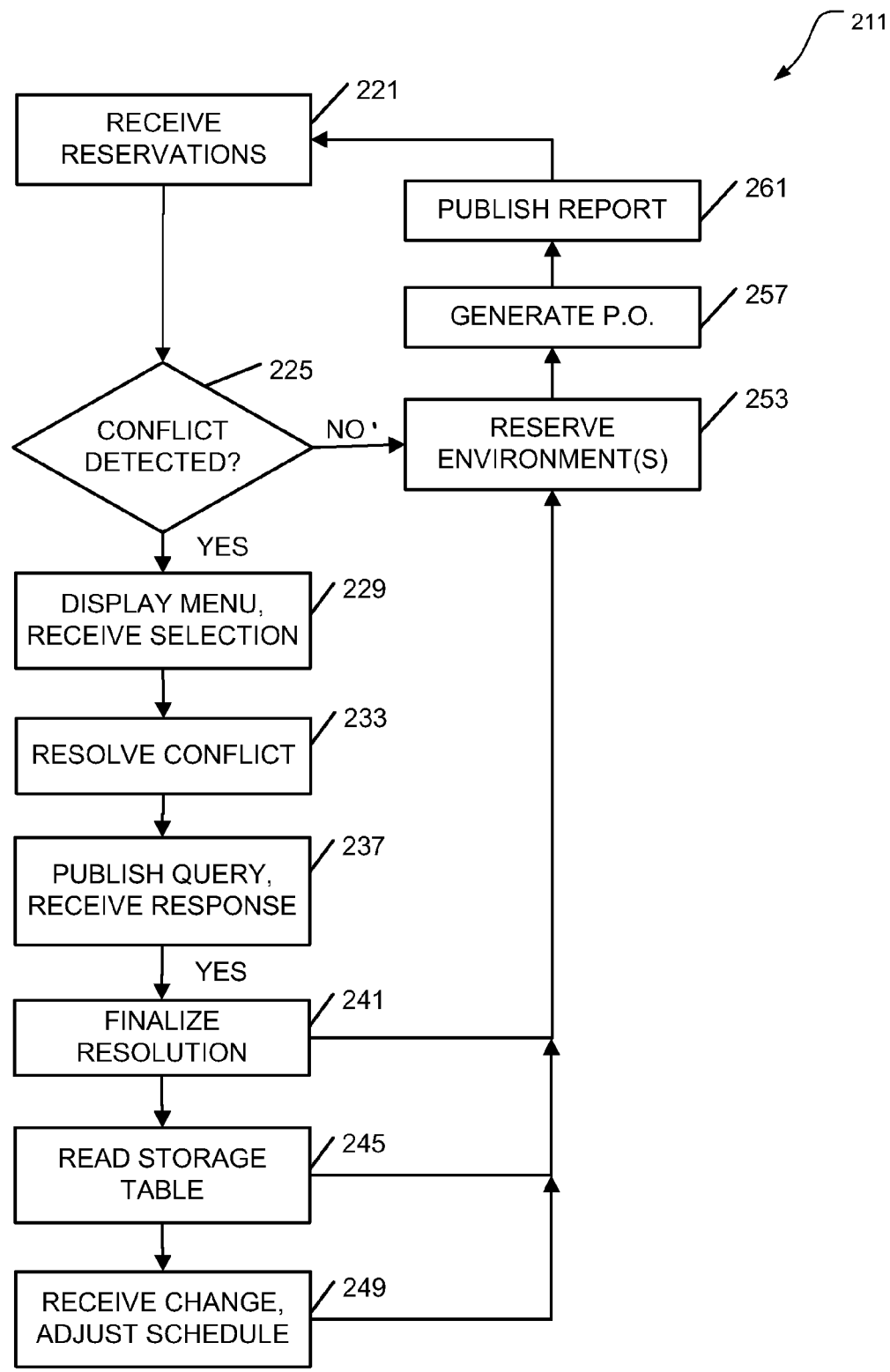
FIG. 2 is a flow diagram illustrating methods of managing resources using environments according to various embodiments of the invention.

For example, FIG. 2 is a flow diagram illustrating methods 211 of managing resources using environments according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

Such methods 211 may operate to receive reservations for environments, detect conflicts that arise, and find a resolution for conflicts based on reserving cloud elements or a less capable version of an existing environment. Thus, in some embodiments, a processor-implemented method 211 that can be executed on one or more processors that perform the method may begin at block 221 with receiving time-based reservation requests for predefined resource environments comprising resource types that include hardware, software, and data, among others.

In some embodiments, an environment is defined by the equipment, applications, and data resource types associated with it (e.g., hardware, software, and data). Resource types can represent a wide variety of individual resources. For example, a host, server, or node might be an example of the hardware resource type; a pre-installed operating system or spreadsheet application might serve as an example of a software resource type, and a data set used to populate a database might be an example of a data resource type. Thus, the resource types may further comprise at least one of locations, communications capacity, or power, among others.

The method 211 may continue on to block 225 to determine whether a conflict is detected. Thus, the activity at block 225 may comprise detecting a conflict between at least one of the resource types in a first one of the predefined resource environments, and at least one of the resource types in a second one of the predefined resource environments. Such a conflict might occur if two groups want to use the same laboratory during the same week, or the same gas chromatograph on the same day, for example.

If no conflict is detected at block 225, the method 211 may continue on to block 253 with reserving the requested environments according to the received reservation requests.

Reservation requests having the same priority can be resolved randomly, or by the end-user. Thus, if a conflict is detected at block 225, the method 211 may continue on to block 229 with displaying a menu of potential resolutions to a conflict between a reservation associated with a first one of the predefined resource environments and a reservation associated with a second one of the predefined resource environments, when the relative importance assigned to a task associated with the first environment is about the same as the relative importance assigned to a task associated with the second environment. The activity at block 229 may further include receiving a selection (either a random choice provided by a conflict processor, or a selection made by an end-user, perhaps received from a user input device) from among the potential resolutions prior to resolving the conflict.

The method 211 may continue on to block 233 with resolving the conflict in favor of the first one of the predefined resource environments by reserving a less capable version of the second one of the predefined resource environments and/or by reserving additional resource elements in a cloud computing architecture. In this case, the relative importance assigned to a first task associated with the first one of the predefined resource environments is usually greater than the relative importance assigned to a second task associated with the second one of the predefined resource environments, even though the broader reservation request in each case may have been assigned the same priority according to the rules established in the system.

An example of this situation might include allocating service environments associated with requests coming into a satellite dish television company. Reservation requests for new customer installations, and reservation requests for repair of existing installations may have the same priority. However, as part of fulfilling each request, the task of testing available bandwidth might be performed. This same test may have greater importance for a new installation reservation request, because all subsequent activity for the request might be predicated on the availability of sufficient bandwidth to support installation. However, in the case of repairing an existing installation, the availability of sufficient bandwidth to support operations may be assumed in most cases, and thus, its determination in fact may not be quite as important as for a new installation.

The conflict may be resolved by allocating priority of resolution to using the less capable version, or to using cloud architecture elements, according to a preference formula. Where a less capable version of a requested environment is available, the less capable version may be reserved subject to a defined tolerance. Thus, the request may contain the tolerance for one or more resource types within an environment. In some embodiments, when a less capable environment is available, and has resources with capabilities that fall within the defined tolerance limits, no end-user menu or query is published.

In some embodiments, if a less capable environment cannot be reserved using the defined tolerance(s), a cloud computing architecture may be considered. In other cases, even when a less capable environment is available, tradeoffs between the less capable environment and resources provided by a cloud computing architecture may be made. Thus, the activity at block 233 may further comprise allocating replacement of resolution resource elements between the additional (available) resource elements in the cloud computing architecture and the less capable version of the second one of the predefined resource environments according to a preference formula. The request may also specify whether such considerations will be permitted, and if so, the cost that may be incurred by trading resources between less capable environments, and resources in the cloud.

The conflict may be resolved so that one of the conflicting environments is retained in its original form. Thus, a constraint on resolving the conflict might comprise resolving the conflict without changing any portion of a reservation associated with the first one of the predefined resource environments, for example.

Conflicts can be resolved in favor of one reservation or another based on the severity level of the issue involved. Thus, the relative importance assigned to the first task and/or the second task (associated with the first and second environments, respectively) may be determined by the level of severity or some other measure of importance associated with an issue arising out of product production and/or service provision (e.g., customer service importance), as noted in the prior examples.

Because resources may be lacking when a reservation is needed, a less capable version of the environment may be reserved as a substitute for that which is requested. Therefore, as new reservations are received, the activity at blocks 225, 233 and 253 may comprise receiving additional time-based reservations for which no exact match is available among the predefined resource environments, and reserving one or more less capable versions of one of the predefined resource environments in place of the additional time-based reservations.

Specifications of resource elements (e.g., processor number and speed, memory size, etc.) can be prioritized within a requested environment, and the priorities can be used to select the less capable version of the environment when a conflict arises. Thus, the activity at block 233 may comprise selecting the less capable version according to a set of ranked priorities assigned to resource element specifications.

The less capable environment can be selected based on the desirability of applications and data location. Thus, the activity at block 233 may comprise selecting the less capable version based on a priority assigned to co-locating the data and the applications.

The less capable environment can be selected according to how close it comes to the requested environment. For example, according to a distance formula that comprises the sum of a weighted (e.g., based on rank) difference between requested environment resource element specifications and the available resource element specifications. Environments having a shorter distance (e.g., with a lower difference value) would be closer to the requested environment. A distance of zero constitutes a match. Thus, the activity at block 233 may comprise selecting the less capable version based on a capability distance computed between the less capable version and another one of the predefined resource environments.

In some embodiments, once a potential resolution of the conflict has been determined, a query seeking approval of the resolution can be posed (e.g., via publication) to an end-user. The query may operate to publish components of the solution to assist in determining whether the proposed resolution is acceptable. Thus, the method 211 may continue on to block 237 to include publishing a query that includes specifications of the additional resource elements and/or the less capable version prior to the resolving. Further activity may include receiving a response to the query, the response being used to determine whether a proposed resolution of the conflict can be finalized.

Environments can be reserved to service items found in an application storage table, such as appointments contained in the personal storage table (*.pst) file for a Microsoft® Outlook® calendar application. Thus, the method 211 may continue on to block 245 with reading an application storage table file to discover additional time-based reservation requests, and reserving some of the predefined resource environments according to the additional time-based reservation requests.

Updates to a project plan can be used to re-schedule environment reservations. Thus, the method 211 may continue on to block 249 with adjusting the schedule associated with at least one of the time-based reservation requests in response to receiving a notification of a project schedule change associated with another one of the time-based reservation requests. The method 211 may continue from block 249 to block 253.

Purchases orders can be generated to accommodate reservations of resources in the cloud computing environment. Thus, the method 211 may continue from block 253 to block 257 with generating a purchase order associated with reserving resource elements in the cloud computing architecture.

System capacity, that is used to-date and/or is remaining to be used, can be reported. Thus, among other things, the method 211 may continue on to block 261 with publishing one or more reports. The reports may include information on used and/or remaining capacity associated with a designated time interval and the predefined resource environments.

The methods described herein do not have to be executed in the order described, or in any particular order. Moreover, various activities described with respect to the methods identified herein can be executed in repetitive, serial, or parallel fashion. The individual activities of the system 160 and methods 211 shown in FIGS. 1 and 2, respectively, can also be combined with each other and/or substituted, one for another, in various ways. Information, including parameters, commands, operands, and other data, can be sent and received in the form of one or more carrier waves. Thus, many other embodiments may be realized.

The methods of resource management using environments shown in FIG. 2 can be implemented in various devices, as well as in a computer-readable storage medium, where the methods are adapted to be executed by one or more processors. Further details of such embodiments will now be described.

Figure 3:
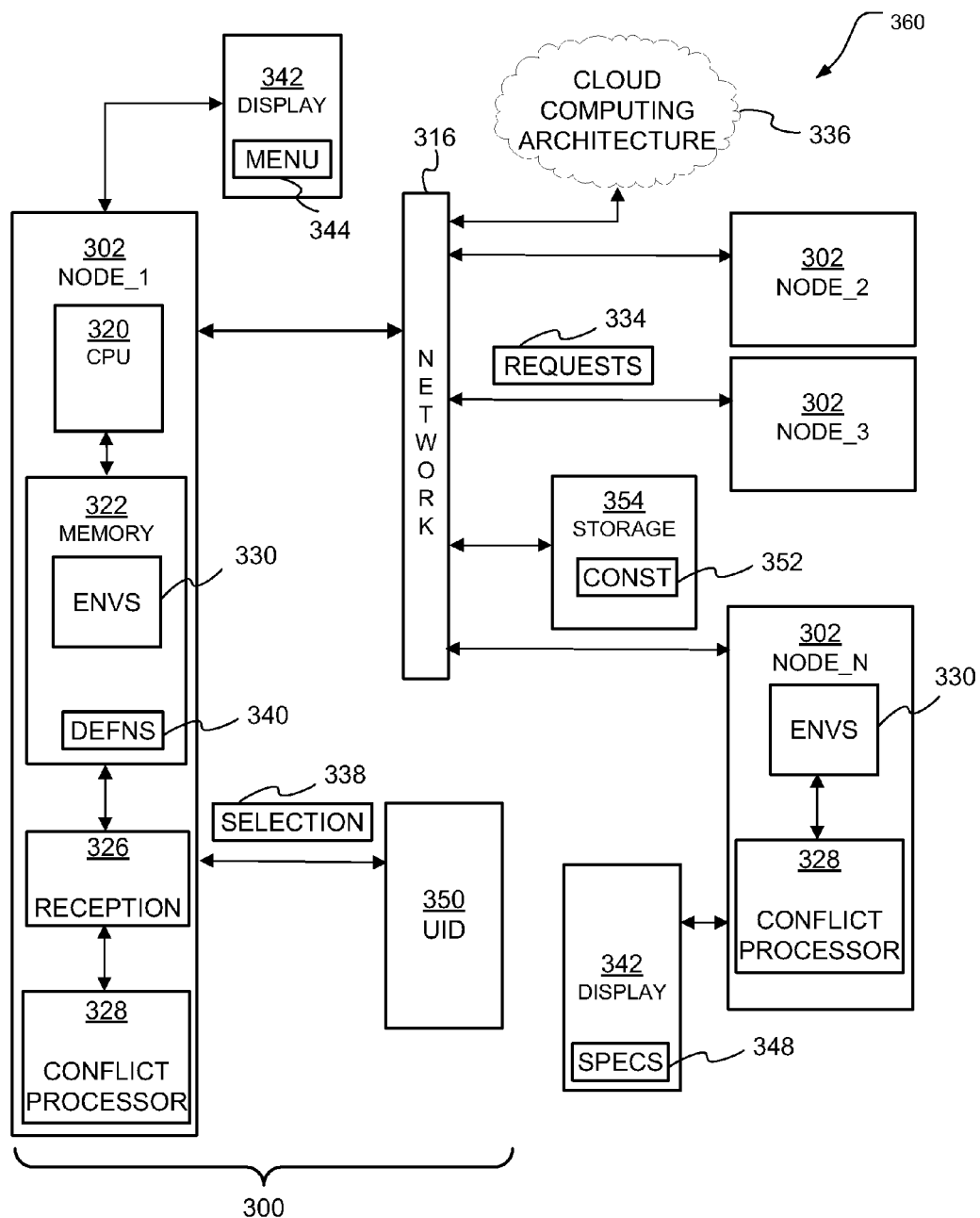
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement resource management may comprise one or more processing nodes 302, one or more processors 320, memory 322, a reception module 326, a conflict processor 328, and one or more displays 342. The apparatus 300 may comprise a server, a client, or some other networked processing node.

The processing nodes 302 may comprise physical machines or virtual machines, or a mixture of both. The nodes 302 may also comprise networked entities, such as servers and/or clients. In some basic implementations, the operations described can occur entirely within a single node 302.

In some embodiments then, an apparatus 300 may comprise a node 302 (e.g., NODE_1) including a reception module 326 to receive time-based reservation requests 334 for predefined resource environments 330 comprising resource types including hardware, software, and data. The apparatus 300 also comprises a conflict processor 328 included in the node to detect a conflict between at least one of the resource types in a first one of the predefined resource environments 330 and at least one of the resource types in a second one of the predefined resource environments 330, and to resolve the conflict in favor of the first one of the predefined resource environments 330 by at least one of reserving additional resource elements in a cloud computing architecture 336 or reserving a less capable version of the second one of the predefined resource environments 330. The relative importance assigned to a first task associated with the first one of the predefined resource environments 330 may be greater than the relative importance assigned to a second task associated with the second one of the predefined resource environments 330.

Environment definitions 340 can be stored in a repository—residing in the node, or elsewhere. Thus, the apparatus 300 may comprise a memory 322 coupled to the node to store definitions 340 associated with the predefined resource environments 330.

A display 342 may form part of the apparatus 300, being used to publish components of the solution, which in turn may be used to assist the end-user in determining whether a particular proposed conflict resolution is acceptable. Thus, the apparatus 300 may comprise one or more displays 342 coupled to the node to publish specifications 348 of the additional resource elements and/or the less capable version. Still further embodiments may be realized.

For example, it can be seen that a system 360 that operates to implement resource management using environments may comprise multiple instances of the apparatus 300. The system 360 might also comprise a cluster of nodes 302, including physical and virtual nodes. It should be noted that any of the nodes 302 may include any one or more of the elements explicitly shown in nodes NODE_1, NODE_N. It should also be noted that the apparatus 300 and system 360 may be similar to or identical to the apparatus 100 and system 160, respectively, of FIG. 1.

In some embodiments then, a system 360 can operate using multiple nodes: one node (e.g., NODE_3) to receive requests 334, and another node (e.g., NODE_N) to process conflicts. Thus, in some embodiments, a system 360 comprises a first node (e.g., NODE_1) including a reception module 326 to receive time-based reservation requests 334 for predefined resource environments 330 comprising resource types including hardware, software, and data. The system 360 may also comprise a second node (e.g., NODE_N) that includes a conflict processor 328 that operates as described previously.

A third node may be used to store resolution constraints 352. Thus, the system 360 may comprise a third node 354 coupled to the second node, the third node 354 to store constraints 352 to be imposed on resolving the conflict.

A display 342 may form part of the system, and be used to determine whether an end-user prefers resolving conflicts using available resources (with reduced capability) or cloud computing architecture based solutions. Thus, the system 360 may comprise one or more displays 342 coupled to one of the first node or the second node, the display 342 to display a menu 344 offering a choice of prioritizing selection between reserving additional resource elements in a cloud computing architecture 336 and reserving a less capable version of the second one of the predefined resource environments 330. Selections 338 may be made with a user input device 350, such as a keyboard, mouse, and/or touch screen.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
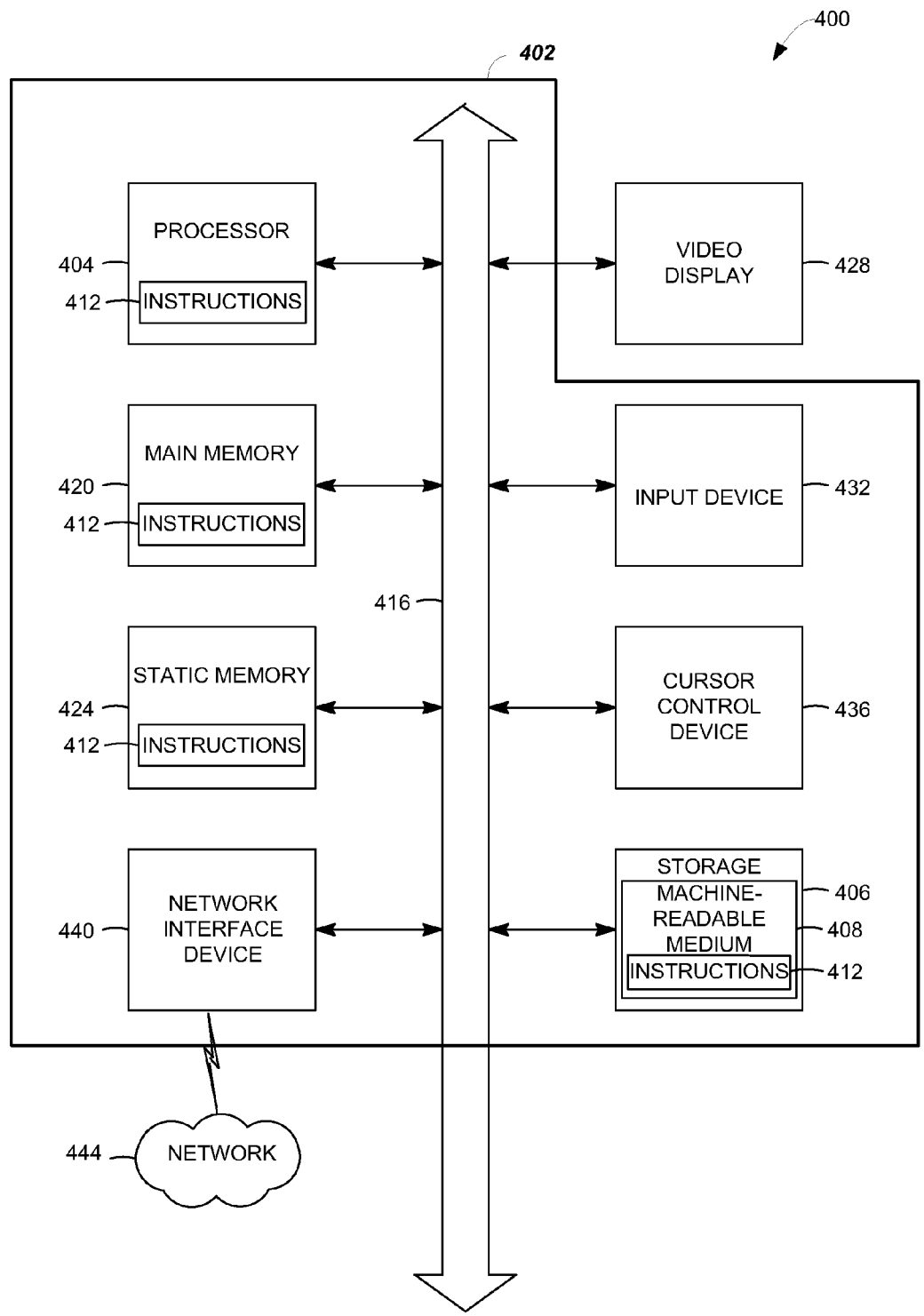
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. Logic programming languages or functional programming languages may also be used. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and/or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide improved resource management, by prioritizing requests and taking advantage of associated cloud computing architectures. Increased project management efficiency, more immediate response to customer service issues, and increased user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
    a node including a reception module to receive time-based reservation requests for predefined resource environments comprising resource types including hardware, software, and data, the data comprising at least
        subject data upon which analytical or transactional processing is to be performed by the software; and
    a conflict processor included in the node
        to detect a conflict between at least one of the resource types in a first one of the predefined resource environments and at least one of the resource types in a second one of the predefined resource environments, the conflict processor being configured to detect the conflict based at least in part on conflicting requirements of the reservation requests with respect to the subject data, and
        to resolve the conflict in favor of the first one of the predefined resource environments by at least one of reserving additional resource elements in a cloud computing architecture or reserving a less capable version of the second one of the predefined resource environments, wherein a relative importance assigned to a first task associated with the first one of the predefined resource environments is greater than a relative importance assigned to a second task associated with the second one of the predefined resource environments.

2. The apparatus of claim 1, further comprising:
    a memory coupled to the node to store definitions associated with the predefined resource environments.

3. The apparatus of claim 1, further comprising:
    a display coupled to the node to publish specifications of the additional resource elements and/or the less capable version.

4. The apparatus of claim 1, wherein the subject data comprises analysis data with respect to which automated analysis is to be performed by use of the software.

5. The apparatus of claim 4, wherein the subject data comprises test data configured for processing by a tested application executed on the hardware.

6. The apparatus of claim 5, wherein the subject data comprises at least one of pre-populated sample test data and user survey data.

7. A system, comprising:
    a first node including a reception module to receive time-based reservation requests for predefined resource environments comprising resource types including hardware, software, and data, the data comprising at least
        subject data upon which analytical or transactional processing is to be performed by the software; and
    a second node including a conflict processor configured to
        detect a conflict between at least one of the resource types in a first one of the predefined resource environments and at least one of the resource types in a second one of the predefined resource environments, the conflict processor being configured to detect the conflict based at least in part on conflicting requirements of the reservation requests with respect to the subject data, and
        resolve the conflict in favor of the first one of the predefined resource environments by at least one of reserving additional resource elements in a cloud computing architecture or reserving a less capable version of the second one of the predefined resource environments, wherein a relative importance assigned to a first task associated with the first one of the predefined resource environments is greater than a relative importance assigned to a second task associated with the second one of the predefined resource environments.

8. The system of claim 7, further comprising:
    a third node coupled to the second node, the third node to store constraints to be imposed on resolving the conflict.

9. The system of claim 7, further comprising:
    a display coupled to one of the first node or the second node, the display to display a menu offering a choice of prioritizing selection between reserving additional resource elements in the cloud computing architecture and reserving the less capable version of the second one of the predefined resource environments.

10. A processor-implemented method to execute on one or more processors that perform the method, comprising:
    receiving time-based reservation requests for predefined resource environments comprising resource types including hardware, software, and data, the data comprising at least
        subject data upon which analytical or transactional processing is to be performed by the software;
    detecting a conflict between at least one of the resource types in a first one of the predefined resource environments and at least one of the resource types in a second one of the predefined resource environments, detecting of the conflict being based at least in part on identifying conflicting requirements of the reservation requests with respect to the subject data; and
    resolving the conflict in favor of the first one of the predefined resource environments by at least one of reserving additional resource elements in a cloud computing architecture or reserving a less capable version of the second one of the predefined resource environments, wherein a relative importance assigned to a first task associated with the first one of the predefined resource environments is greater than a relative importance assigned to a second task associated with the second one of the predefined resource environments.

11. The method of claim 10, wherein the resource types further comprise at least one of locations, communications capacity, or power.

12. The method of claim 10, further comprising:
    publishing a query including specifications of the additional resource elements and/or the less capable version prior to the resolving; and receiving a response to the query, the response to determine whether a proposed resolution of the conflict can be finalized.

13. The method of claim 10, further comprising:
reading an application storage table file to discover additional ones of the time-based reservation requests; and
reserving some of the predefined resource environments according to the additional ones of the time-based reservation requests.

14. The method of claim 10, wherein resolving the conflict further comprises:
allocating replacement of resolution resource elements between the additional resource elements in the cloud computing architecture and the less capable version of the second one of the predefined resource environments according to a preference formula.

15. The method of claim 10, wherein a constraint on resolving the conflict comprises resolving the conflict without changing any portion of a reservation associated with the first one of the predefined resource environments.

16. The method of claim 10, wherein the relative importance assigned to the first task and/or the second task is determined by a level of severity associated with an issue arising out of product production and/or service provision.

17. The method of claim 10, further comprising:
receiving an additional time-based reservation for which no exact match is available among the predefined resource environments; and
reserving a less capable version of one of the predefined resource environments in place of the additional time-based reservation.

18. The method of claim 10, further comprising:
selecting the less capable version according to a set of ranked priorities assigned to resource element specifications.

19. The method of claim 10, further comprising:
adjusting a schedule associated with at least one of the time-based reservation requests in response to receiving a notification of a project schedule change associated with another one of the time-based reservation requests.

20. The method of claim 10, further comprising:
displaying a menu of potential resolutions to a new conflict between a reservation associated with the first one of the predefined resource environments and a third one of the predefined resource environments, when the relative importance assigned to the first task is about the same as a relative importance assigned to a third task associated with the third one of the predefined resource environments; and
receiving a selection from among the potential resolutions prior to resolving the conflict.

21. The method of claim 10, further comprising:
publishing a report on used and/or remaining capacity associated with a designated time interval and the predefined resource environments.

22. The method of claim 10, further comprising:
generating a purchase order associated with reserving the additional resource elements in the cloud computing architecture.

23. The method of claim 10, further comprising:
selecting the less capable version based on a priority assigned to co-locating the data and the applications.

24. The method of claim 10, further comprising:
selecting the less capable version based on a capability distance computed between the less capable version and the second one of the predefined resource environments.

* * * * *

UNITED STATES PATENT AND TRADEMARK OFFICE
CERTIFICATE OF CORRECTION

PATENT NO.          : 8,635,624 B2                                                          Page 1 of 1
APPLICATION NO.     : 12/908903
DATED               : January 21, 2014
INVENTOR(S)         : Subramanya et al.

It is certified that error appears in the above-identified patent and that said Letters Patent is hereby corrected as shown below:

On the Title page, in item (75), in "Inventors", in column 1, line 5, delete "Point" and insert --Pointe--, therefor In the Claims In column 13, line 25, in Claim 1, after "least", delete "¶", therefor In column 14, line 41, in Claim 10, after "least", delete "¶", therefor Signed and Sealed this
Second Day of December, 2014

Michelle K. Lee
*Deputy Director of the United States Patent and Trademark Office*